(12) United States Patent
Blum et al.

(10) Patent No.: US 10,396,685 B2
(45) Date of Patent: Aug. 27, 2019

(54) MODULAR MULTI-STAGE CONVERTER

(71) Applicant: Siemens Aktiengesellschaft, Munich (DE)

(72) Inventors: Manuel Blum, Ottobrunn (DE); Marek Galek, Polling (DE); Alexander Hofmann, Erlangen (DE); Dirk Malipaard, Nürnberg (DE); Benjamin Ruccius, Nürnberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/084,438

(22) PCT Filed: Feb. 20, 2017

(86) PCT No.: PCT/EP2017/053762
§ 371 (c)(1),
(2) Date: Sep. 12, 2018

(87) PCT Pub. No.: WO2017/157614
PCT Pub. Date: Sep. 21, 2017

(65) Prior Publication Data
US 2019/0081573 A1 Mar. 14, 2019

(30) Foreign Application Priority Data
Mar. 18, 2016 (EP) .................................... 16161060

(51) Int. Cl.
*H02M 7/757* (2006.01)
*H02M 7/483* (2007.01)
(Continued)

(52) U.S. Cl.
CPC ......... *H02M 7/7575* (2013.01); *H02M 7/219* (2013.01); *H02M 7/483* (2013.01);
(Continued)

(58) Field of Classification Search
CPC ....... H02M 7/7575; H02M 2001/0003; H02M 2007/4835; H02M 7/10; H02M 7/19; H02M 7/219; H02M 7/797; H02M 7/758
See application file for complete search history.

(56) References Cited

U.S. PATENT DOCUMENTS

| | | | |
|---|---|---|---|
| 6,275,936 B1 * | 8/2001 | Kyojima | G06F 21/62 713/161 |
| 9,774,187 B2 * | 9/2017 | Eckel | H02J 3/36 |

(Continued)

FOREIGN PATENT DOCUMENTS

| | | | | |
|---|---|---|---|---|
| DE | 102011017597 A1 | 10/2012 | | H02J 15/00 |
| EP | 2677653 A1 | 12/2013 | | H02M 7/483 |

(Continued)

OTHER PUBLICATIONS

European Search Report, Application No. 16161060.5, 7 pages, dated Aug. 30, 2016.
(Continued)

*Primary Examiner* — Gary L Laxton
*Assistant Examiner* — Peter M Novak
(74) *Attorney, Agent, or Firm* — Slayden Grubert Beard PLLC

(57) ABSTRACT

Some embodiments may include a multi-stage converter comprising: a branch connected between a positive busbar and a negative busbar; and a control device. The branch has two arms connected in series. The arms each comprise a series circuit including a plurality of two-pole submodules, an energy store, and a communication connection to the control device. The communication connection transmits state of charge of the energy store and a switching instruction for the respective submodule. For at least a subset of the submodules, the communication connection comprises a common communication connection with a plurality of insulation paths having an insulation capability in each case of at most 5 kV.

13 Claims, 5 Drawing Sheets

(51) Int. Cl.
*H02M 7/219* (2006.01)
*H02M 1/00* (2006.01)
*H02M 1/32* (2007.01)
*H02M 7/10* (2006.01)

(52) U.S. Cl.
CPC ...... *H02M 7/10* (2013.01); *H02M 2001/0003* (2013.01); *H02M 2001/325* (2013.01); *H02M 2007/4835* (2013.01)

(56) References Cited

U.S. PATENT DOCUMENTS

| | | | |
|---|---|---|---|
| 2012/0229080 A1 | 9/2012 | Leu et al. | 320/107 |
| 2014/0203645 A1* | 7/2014 | Leu | H02M 7/217 |
| | | | 307/52 |
| 2016/0308360 A1* | 10/2016 | Oates | H02M 1/32 |
| 2018/0109199 A1* | 4/2018 | Fujita | H02M 3/158 |

FOREIGN PATENT DOCUMENTS

| | | | |
|---|---|---|---|
| RU | 2524363 C2 | 7/2014 | ............ H02M 7/483 |
| WO | 2017/157614 A1 | 9/1917 | .............. H02M 7/00 |

OTHER PUBLICATIONS

International Search Report and Written Opinion, Application No. PCT/EP2017/053762, 13 pages, dated Apr. 21, 2017.
Russian Decision to Grant, Application No. 2018133594/07, 10 pages, dated May 23, 2019.

* cited by examiner

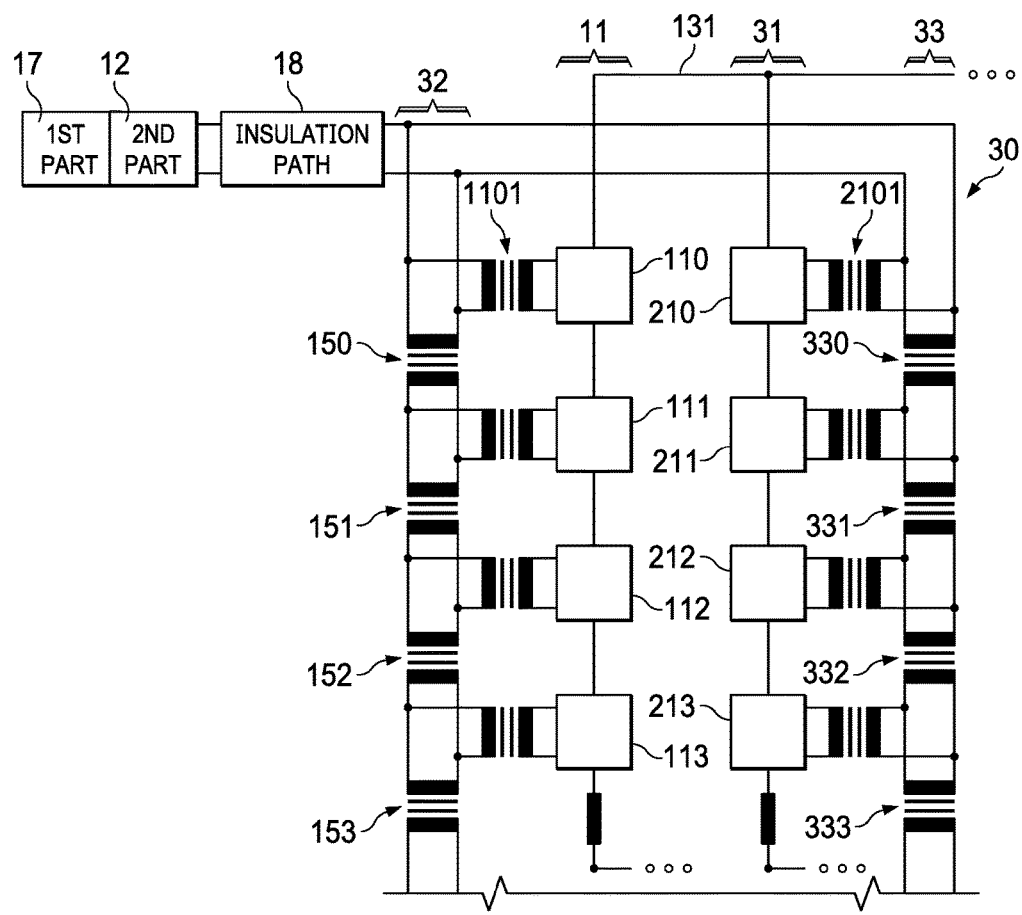

MODULAR MULTI-STAGE CONVERTER

CROSS-REFERENCE TO RELATED APPLICATIONS

This application is a U.S. National Stage Application of International Application No. PCT/EP2017/053762 filed Feb. 20, 2017, which designates the United States of America, and claims priority to DE Application No. 16161060.5 filed Mar. 18, 2016, the contents of which are hereby incorporated by reference in their entirety.

TECHNICAL FIELD

The present disclosure relates to converters. Various embodiments may include a modular multi-stage converter with a series circuit comprising a number of modules.

BACKGROUND

A modular multi-stage converter, also called a Modular Multilevel Converter or MMC or M2C for short, converts a first voltage into another voltage. A modular multi-stage converter can convert a DC voltage into an AC voltage for example, i.e. it is used as an inverter. A modular multi-stage converter can moreover convert an AC voltage into a DC voltage for example, i.e. it is used as a rectifier. Furthermore, a modular multi-stage converter can convert a first AC voltage into a second AC voltage with a different frequency and amplitude, without first of all creating a DC voltage, i.e. it is used as a direct converter.

Modular multi-stage converters are primarily used in high-power applications. An inverter may be used in a photovoltaic power plant, in which the DC voltage generated by the power plant must be converted into an AC voltage, in order to be able to feed said AC voltage into an alternating current network. A modular multi-stage converter is needed as a rectifier for example in high-voltage direct current (HVDC) transmission. In such systems a DC voltage, which is needed for low-loss transport over long transmission routes, is created from an AC voltage. After its transmission the DC voltage is again converted into an AC voltage with a modular multi-stage converter as an inverter, in order to feed said voltage into an alternating current network.

In its structure a modular multi-stage converter typically comprises at least one series circuit with a number of modules connected in series. EP 2677653 A1 discloses a modular multi-stage converter which comprises three series circuits with 2N modules. Each of the series circuits is divided by an AC voltage line into two arms. Each arm in its turn is connected via a choke element to the AC voltage line. Each module also has an energy store and a switching device. The respective energy store is configured to store electrical energy. In each module the energy store can be charged at least partly with electrical energy. With the aid of the switching device it can be controlled whether the energy store of the respective module is to be charged or discharged or whether the energy store is to be bypassed.

The switching devices of the modules are activated by the control device for the multi-stage converter. For this and for feeding back measured values for charging of the respective energy store, bidirectional communication connections between the modules and the control device are necessary. These are typically realized in high-power applications as point-to-point optical fiber connections. These are expensive, however, because of the quantity of connections between the control device and each of the modules. As an alternative, electrical bus connections may be used. With these a suitable electrical insulation between the bus and the individual modules has to be insured, which is likewise complicated and expensive.

SUMMARY

The teachings of the present disclosure may be embodied in a powerful and low-cost modular multi-stage converter with an improved architecture for the communication connections. For example, some embodiments include a multi-stage converter (10, 20, 30) with at least one branch (11, 31), which is connected between a positive busbar (131) and a negative busbar (132). The branch (11, 31) has at least two arms connected in series, wherein the arms each comprise a series circuit made up of a plurality of two-pole submodules (110 ... 117, 210 ... 217), which have an energy store and a communication connection to a control device (12, 17) of the multi-stage converter (10, 20, 30), by means of which at least one item of information (421 ... 425) about a state of charge of the energy store as well as a switching instruction (411 ... 414) for a switch of the submodule (110 ... 117, 210 ... 117) is able to be transmitted. For at least a part of the submodules (110 ... 117, 210 ... 117), the communication connection is set up as a common communication connection and has a plurality of insulation paths (150 ... 156, 210 ... 212 330 ... 336), which have an insulation capability in each case of at most 5 kV.

In some embodiments, the insulation paths (150 ... 156, 210 ... 212 330 ... 336) have an insulation capability in each case of at most 3.3 kV, 2 kV, in particular of at most 1.5 kV or 600 V.

In some embodiments, the communication connections of all submodules (110 ... 117, 210 ... 117) of an arm or of a branch are constructed as a common communication connection.

In some embodiments, there is one communication connection in each case for each of the arms.

In some embodiments, there is a common communication connection in each case for each of the branches (11, 31).

In some embodiments, the communication connections form at least one bus connection, in which signals of each submodule (110 ... 117, 210 ... 117) are able to be received directly by the control device (12, 17) and vice versa.

In some embodiments, the common communication connection is constructed as connections from one submodule (110 ... 117, 210 ... 117) to the next submodule (110 ... 117, 210 ... 117).

In some embodiments, the common communication connection between the connection points of two neighboring submodules (110 ... 117, 210 ... 117) in the series circuit of the arm has of one of the insulation paths (150 ... 156, 210 ... 212 330 ... 336).

In some embodiments, the number of insulation paths is at least half the number of submodules (110 ... 117, 210 ... 117), in particular is at least 90% of the number of submodules (110 ... 117, 210 ... 117).

In some embodiments, the order of linkage of the submodules (110 ... 117, 210 ... 117) to the common communication connection corresponds to the order of the arrangement in the respective arm of the multi-stage converter (10, 20, 30).

In some embodiments, the common communication connection is embodied in the form of a ring with two strands (32, 33) connected in parallel to one another, which are connected to one another at the connection point of a first submodule (110 ... 117, 210 ... 117) and at the connection point of a second submodule (110 ... 117, 210 ... 117).

In some embodiments, both strands (32, 33) have the same number of insulation paths (150 ... 156, 210 ... 212 330 ... 336).

In some embodiments, submodules (110 ... 117, 210 ... 117) of a first arm of a first branch (11, 31) are connected to a first of the strands (32, 33) and submodules (110 ... 117, 210 ... 117) of a first arm of a second branch (11, 31) are connected to a second of the strands (32, 33).

BRIEF DESCRIPTION OF THE DRAWINGS

Further embodiments of the multi-stage converter emerge from the greater detail below with reference to the drawing. In this, in schematic form in each case.

DETAILED DESCRIPTION

Figure 1:
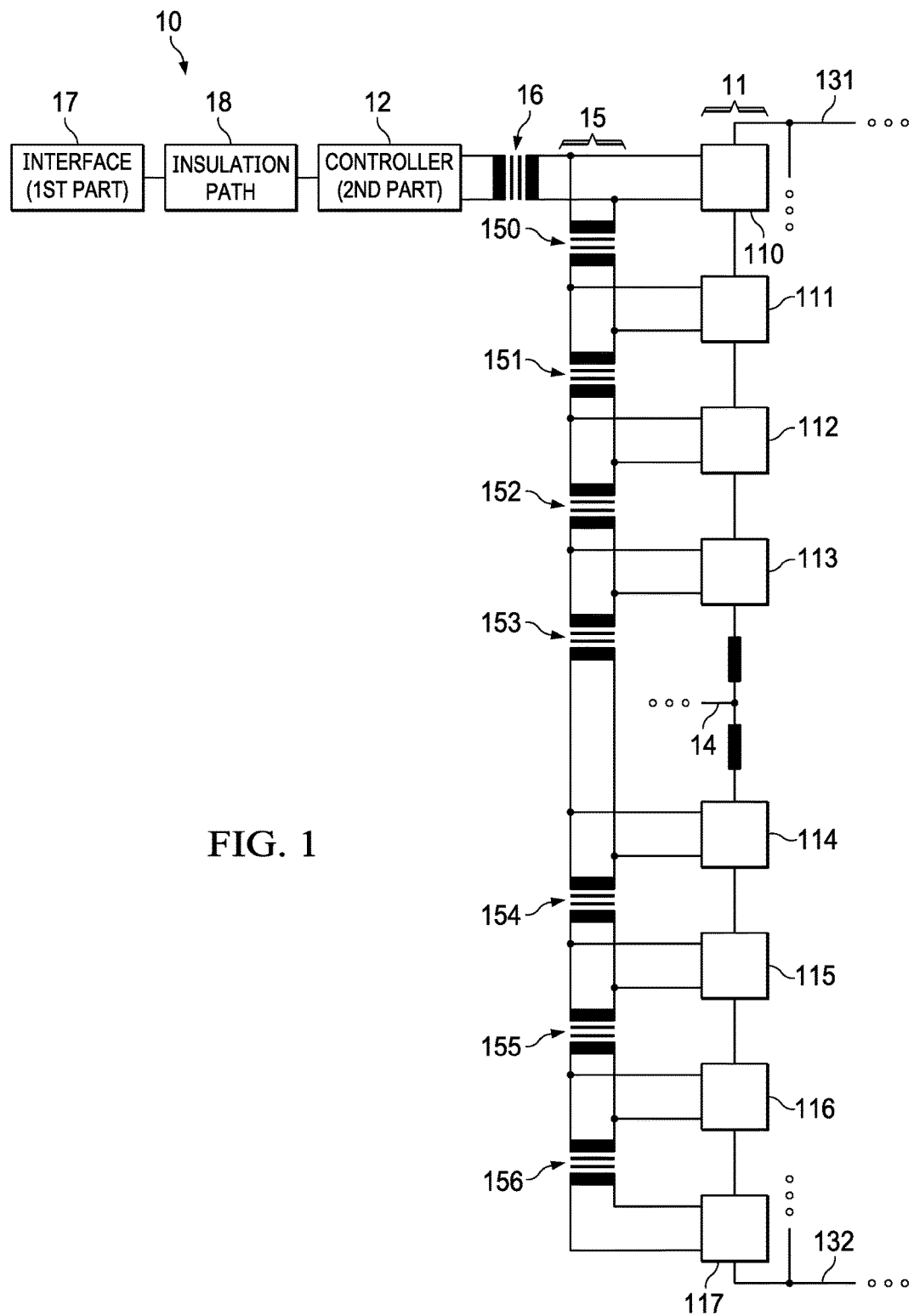
FIG. 1 shows a section of a first multi-stage converter with a communication bus for a branch, according to the teachings of the present disclosure.

In some embodiments, a multi-stage converter comprises at least one branch, which is connected between a positive busbar and a negative busbar, wherein the branch has at least two arms connected in series and wherein the arms are each comprise a series circuit made up of a plurality of two-pole submodules. The submodules each comprise an energy store and a communication connection to a control device of the multi-stage converter, wherein at least one item of information about a charging state of the energy store and also a switching instruction for a switch of the submodule is able to be transmitted by means of the communication connection.

The multi-stage converter is characterized by the communication connection being constructed for at least a part of the submodules as a common communication connection and having a plurality of information paths, which have an insulation capability of at most 5 kV. In some embodiments, the multi-stage converter, at least for a part of its modules, comprises a common communication connection, which is divided by the insulation paths into subareas insulated electrically from one another.

In some embodiments, the complicated and expensive point-to-point connections between the control device and the modules can be dispensed with and can be replaced by the common communication connection. In this case the design of the division into subareas insures that the voltage drop over the insulation paths amounts to at most 5 kV. This enables suitable low-insulation and simplified elements to be used as insulation paths, of which the maximum insulation capability lies far below the operating voltages, which frequently occur in applications of MMC/M2C power converters. The insulation paths may comprise transformers, but some embodiments may include capacitors or capacitive or inductive couplers. In some low-power or medium-power systems, in which the activation system makes up a large proportion of the total costs, a significant reduction of the construction costs and savings in the space needed are achieved in this way.

In some embodiments, the following additional features can also be provided for the power converter:

The division of the common communication connection into subareas can be designed such that the voltage drop over at least a part of the insulation paths between two subareas amounts in each case to at most 3.3 kV, 2 kV. In further embodiments 1.2 kV, 1 kV or also 600 V can be an upper limit for the voltage drop. In such cases the division may be regulated by the number of insulation paths used. In particular this is at least 10, or in some embodiments, at least 20 insulation paths, wherein the numbers relate to one arm or one branch of the multi-stage converter.

The common communication connection may be arranged separately for at least one arm of one branch, or for all arms of the multi-stage converter, or for one or more or all of the branches of the multi-stage converter. In this case the communication connections of all submodules of an arm or of a branch may comprise a common communication connection.

One common communication connection can be provided in each case for each of the arms. As an alternative, one common communication connection can be present in each case for each of the branches.

In some embodiments, the communication connections comprise at least one bus connection, in which signals of each submodule are able to be received directly by the control device and vice versa. Thus, no point-to-point connection is used. In some embodiments, this saves in installation space and complexity in the construction, since with multi-stage converters with a large number of submodules a large number of optical or electrical cables can be saved.

In some embodiments, the common communication connection comprises connections from one submodule to the next submodule. In other words, the control device for the multi-stage converter will be connected to a first of the submodules and this in its turn will be connected to a further submodule etc. In this case, however there may be no direct through-connection of the individual subareas of the common communication connection. For communication of a submodule with the control device and vice-versa the data packets in this embodiment may therefore be forwarded from submodule to submodule. Thus, a star-type connection may provide the same advantages as with the bus connection.

The number of insulation paths can amount to at least half of the number of the submodules, in particular to at least 90% of the number of submodules. In some embodiments, these are at least 10, in particular at least 20 insulation paths. In some embodiments, the common communication connection between the connection points in each case of two neighboring submodules in the series circuit of the arm has one of the insulation paths in each case, so that the number of insulation paths essentially corresponds to the number of submodules.

The order of the connection of the submodules to the common communication connection may correspond to the order of the arrangement of the submodules in the respective arm of the multi-stage converter. Through this the voltage drop between the connection points of the submodules to the communication connection is restricted to that voltage difference that the submodules can provide through their energy stores.

The common communication connection may comprise a ring with two strands connected in parallel to one another, which are connected to one another at the connection point of a first submodule and at the connection point of a second submodule. The ring-type embodiment is possible with both a bus connection and also a strand-type connection. In both cases the ring-type design increases the fault tolerance, since a redundancy is created in the communication with the submodules.

In some embodiments, just a first of the strands has direct connections with the submodules, while the second strand is only connected to the first strand at the two connection points mentioned and is thus connected indirectly to the submodules. A redundancy of the communication may be created by this, with at the same time there still being a very simple structure, since in the second strand the many connection points to the submodules are unnecessary.

In some embodiments, both strands include direct connections to the submodules. The fault tolerance of the communication is further increased by this, since with this structure, even in the event of the failure of a number of part components in each of the strands, all submodules are still able to be activated under some circumstances.

In both cases, when both strands have direct connections to the submodules or when only one of the strands has direct connections to the submodules, the same number of insulation paths is essentially used in both parallel strands of the ring bus. Through this the necessary insulation capability is established in both strands.

If one of the strands has no direct connections to the submodules, then in this strand the insulation capability between the connection points can, as an alternative, be established by a single or few insulation paths of higher insulation capability, in order to save installation space.

The submodules of a first arm of a first branch can be connected to a first of the strands and the submodules of a first arm of a second branch to a second of the strands. Through this a ring-type communication connection is created, in which submodules of two branches, i.e. for example of two phases, are activated jointly. The submodules, which are arranged close to the DC voltage busbars, i.e. in particular the first and last module of each branch, beyond the branches, have the voltage level lying closest to one another, while the modules lying centrally in a branch when used as inverters have voltage levels that change greatly and differ from one another. Therefore, a cross connection of the communication connection between the branches may be made in the area of the first and/or the second module of each branch involved. This enables a cross connection to be made without having to use a highly-insulating insulation path in doing so. The cross connection can either be made directly, without insulation, or using one or more insulation paths with a maximum insulation capability of 3.3 kV or 2 kV.

The control device may be linked to the communication connection in a subarea of the communication connection, of which the voltage level lies close to that of the control device. In some embodiments, the control device may be connected to the communication connection via a highly insulating insulation path.

FIG. 1 shows a first example of the communication connections for a first example of a multi-stage converter 10. In this figure, only sections of the first multi-stage converter 10 are shown. The first multi-stage converter 10 converts a DC voltage present between a positive DC voltage busbar 131 and a negative DC voltage busbar 132 into a three-phase AC voltage. To this end the first multi-stage converter 10 has a branch 11 for each of the three phases, of which, for improved clarity, only the first branch 11 is shown. The branch has two arms connected in series, wherein each of the arms in its turn has a number of modules connected in series. The first branch 11 of the first multi-stage converter has four modules 110 . . . 113 in its upper arm. In this case this is only an example for the number of modules. Multi-stage converters can also have 30, 50 or 100 modules per arm or per branch. The lower arm of the first branch 13 likewise has four modules 114 . . . 117.

In the example depicted in FIG. 1, the control of the multi-stage converter 10 comprises two separate parts: A first part 17, which comprises the Human-Machine interface and other external interfaces. The first part 17 is arranged at ground potential. The first part 17 is connected to a second part 12 of the control via an insulation path 18 with a high insulation capability. The second part 12 of the control is embodied to undertake the control of the modules 110 . . . 117 and thus controls the actual function of the first multi-stage converter 10.

The connection of the second part 12 of the control to the modules 110 . . . 117 is made via an electrical communication bus 15. The communication bus 15 is connected to the second part 12 of the control via a first insulation path, in the form of a transformer 16, for example. Since the second part 12 of the control is decoupled from ground potential by the insulation path 18 with high insulation capability, the second part 12 itself can operate at a voltage level that essentially corresponds to the voltage level of one or more of the modules 110 . . . 117. Therefore, the transformer 16 may have a maximum insulation capability of for example 3 kV, 2.5 kV, 2 kV, or also just 1 kV. In some embodiments, a high insulation capability between the second part 12 of the control and the communication bus 15 is unnecessary. In some embodiments, the voltage level of those of the modules 110 . . . 117 that couple directly onto the DC busbars may be determined by the voltage of the DC busbars, so that it makes sense to connect the second part 12 at these modules 110, 117. The second part 12 can however also couple on at another point of the communication bus 15 at which a temporally variable voltage level is present through the insulation path 18.

As well as an inductive coupling via the transformer 16, 150 . . . 156, the subareas can also be coupled capacitively or optically, wherein in any event the necessary insulation capability is restricted to the values already mentioned. The individual modules 110 . . . 117 have two-wire and direct connections without further insulation to the communication bus 15. Between the links of the communication bus 15 to the individual modules the communication bus 15 itself is in its turn subdivided by further transformers 150 . . . 156 into two-wire sections electrically insulated from one another. The insulation capability of the individual transformers 150 . . . 156 lies in this case in the range of the maximum voltage that an individual module of the modules 110 . . . 117 creates. This insulation capability is sufficient since the division of the communication bus 15 into sections and their connection to the modules 110 . . . 117 follows the arrangement of the modules 110 . . . 117 itself and thus the voltage difference between the sections corresponds to the individual module voltage, i.e. the voltage difference able to be created by the module 110 . . . 117. Thus, for example, transformers 150 . . . 156 with a maximum insulation capability of 2 kV can be used, although the multi-stage converter 10 is designed for a significantly higher operating voltage.

In some embodiments, as shown in FIG. 1, there is therefore a separate section for each of the modules 110 . . . 117 insulated from the rest of the communication bus 15. In some embodiments, the number of the insulation paths, of the transformers 150 . . . 156, could also be reduced in relation to the number of the modules 110 . . . 117, so that for example two modules 110 . . . 117 in each case share a section of the communication bus 15. In such an embodiment, the transformers insulate twice the module voltage.

Thus, by comparison with a point-to-point, for example optical, linkage of the modules 110 . . . 117, instead of eight highly-insulating optical connections, which are complex, disadvantageous in installation space terms with a large number of modules and expensive, advantageously just one highly-insulating connection and in the example given, eight simple transformers 16, 150 . . . 156 with an insulation capability of for example 2 kV are used.

Even if an end-to-end bus connection, as is known from the prior art, is used, its voltage level is markedly removed from that of most of the modules 110 . . . 117 and highly-insulating connections are needed to the respective module. In the present example, ultimately likewise eight highly-insulating, for example optical, connections with the same disadvantages already discussed, which may be overcome by the teachings herein.

Figure 2:
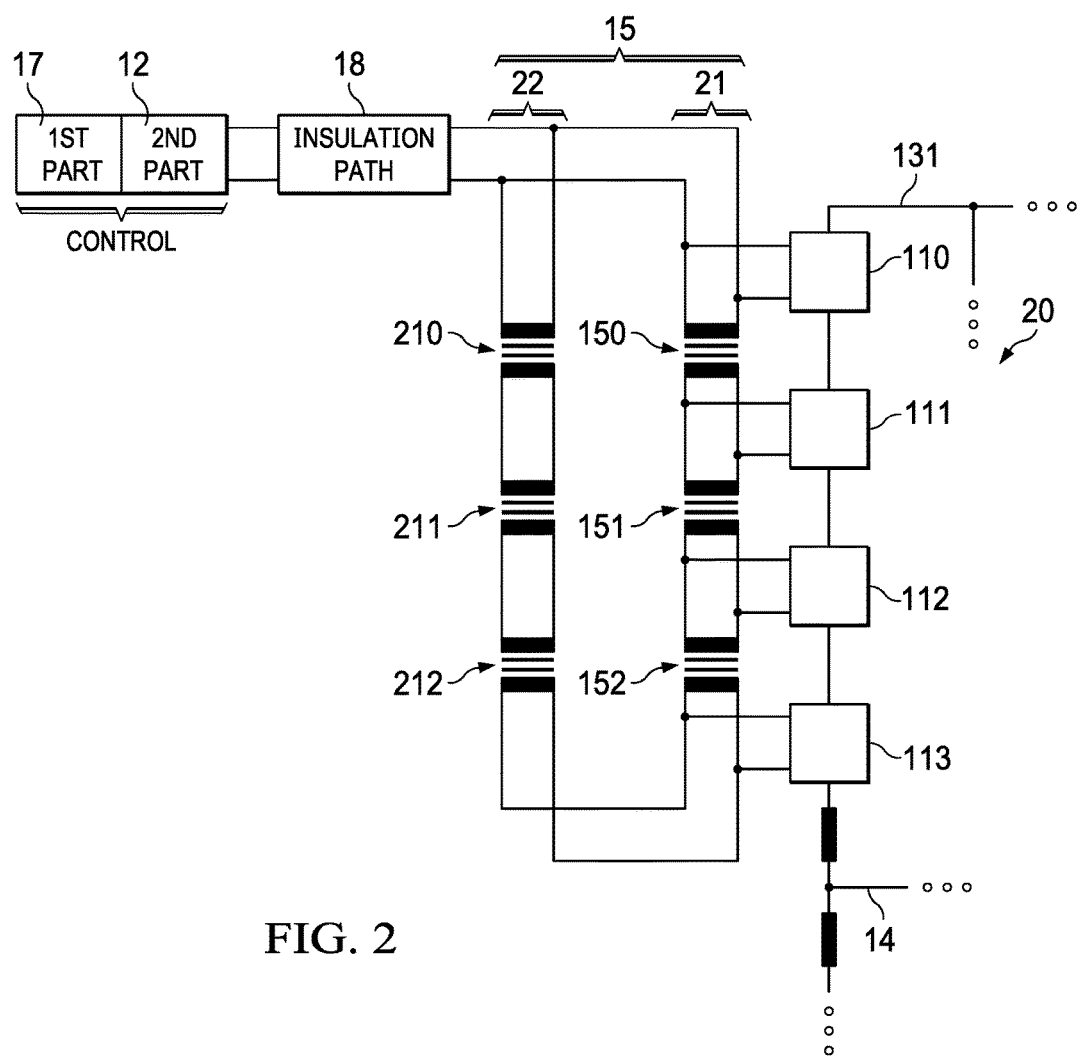
FIG. 2 shows a section of a second multi-stage converter with a ring bus for an arm of a branch, according to the teachings of the present disclosure.

FIG. 2 shows, as a second exemplary embodiment, a section of a second multi-stage converter 20, which is constructed in relation to its modules and connections in a similar manner to the first multi-stage converter 10. However, in this exemplary embodiment the activation of the modules is established differently from the first exemplary embodiment in accordance with FIG. 1. In FIG. 2, the control is arranged at ground potential, complete with its first and second part 17, 12. The connection between the second part 12 and the communication bus 15 is therefore made in the second exemplary embodiment via an insulation path 18 with high insulation capability, for example a highly-insulating optical connection.

The communication bus 15 itself is divided into two parallel strands 21, 22, which form a ring bus. In some embodiments, the communication bus 15, by contrast with the embodiment of FIG. 1, is only designed for the modules 110 . . . 113 of one arm of one branch, while for the further modules of the other arms of the branch 11 and of the further branches, additional communication buses separate from one another are embodied. The division into a number of communication buses increases the frequency of activation of the individual modules 110 . . . 113 and thereby improves the operation of the multi-stage converter 20.

In some embodiments, the first of the two strands 21 is in this case realized in a similar manner to the communication bus 15 from the first exemplary embodiment. The modules 150 . . . 0.153 are connected directly to the respective section of the first strand 21. Arranged between the linkage points of the modules 150 . . . 153 in each case is an insulation path in the form of a transformer 150 . . . 0.152, which divides the first strand 21 into insulated subareas.

By contrast with communication bus 15 from FIG. 1, however, the second strand 22 is provided, equipped as a connection of the connection points of the first module 110 and the third module 113 lying in parallel to the first strand 21. The second strand 22 in this case is likewise divided in the same way by three transformers 210 . . . 212 into subareas in a similar manner to the first strand 21, through which the same overall insulation capability between the two connection points of the second strand 22 is created. By contrast with the first strand 21 no modules are connected to the second strand 22. It is therefore possible, as an alternative to the transformers 210 . . . 212, also to establish the insulation capability of the second strand 22 by another highly-insulating insulation path, in which there is no division into subareas. Overall a redundant linkage of the modules is achieved by the two strands 21, 22. Through this the fault tolerance of the multi-stage converter 20 may be improved.

Figure 3B:
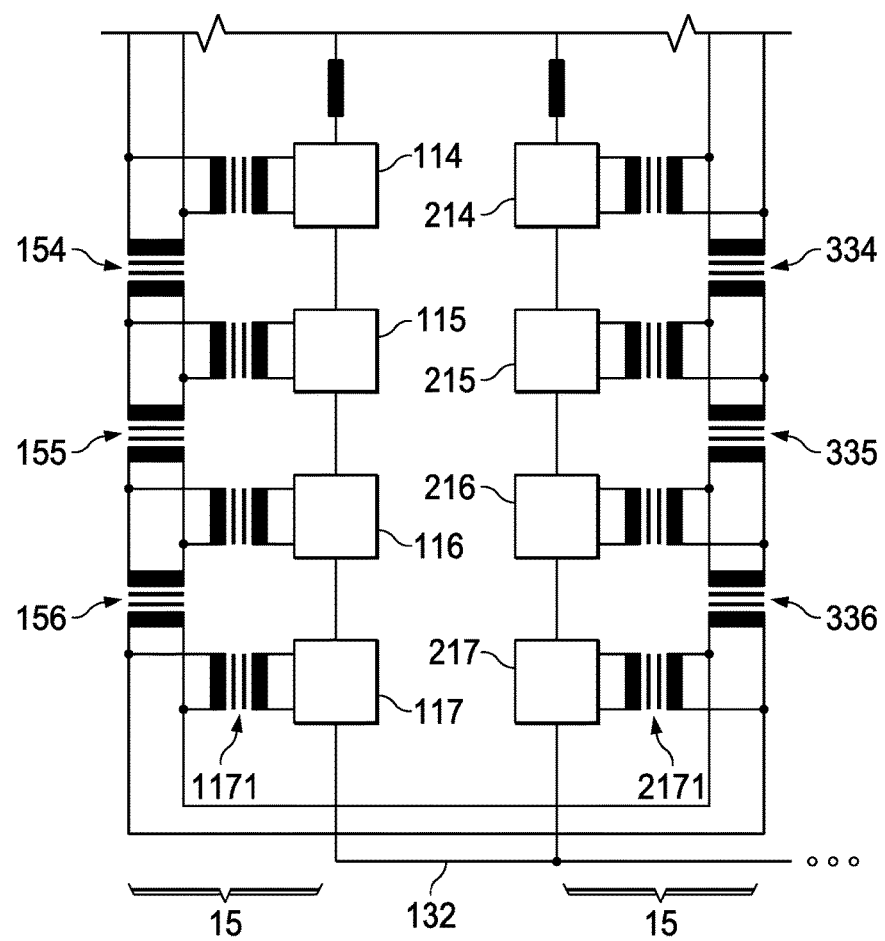
FIG. 3 shows a section of a third multi-stage converter with a ring bus for two branches, according to the teachings of the present disclosure.

FIG. 3 shows, as a third exemplary embodiment, a section of a third multi-stage converter 30, which is constructed in relation to its modules and connections in a similar manner to the first and second multi-stage converters 10 and 20. However, in FIG. 3, the activation of the modules is again established differently from FIG. 1. As already stated, the number of modules per branch of eight is only by way of example and real converters can comprise significantly more modules per branch.

In some embodiments, the control, as in FIG. 2, is arranged at ground potential complete with the first and second part 17, 12. The connection between the second part 12 and the communication bus 15 is therefore made in the second exemplary embodiment via an insulation path with high insulation capability, for example a highly-insulating optical connection.

In some embodiments, the communication bus 15 comprises a first and a second strand 32, 33, which are connected in parallel to one another. By contrast with FIG. 2, however, the second strand 33 is not present as mere redundancy, but serves to activate the modules 210 . . . 217. The first and second strand 32, 33, in a similar way to the previous exemplary embodiments, are divided for this purpose into subareas by insulation paths in the form of transformers 150 . . . 156, 330 . . . 336. By contrast with FIGS. 1 and 2, an insulation path is present in the form of a transformer in the connection of each of the modules 110 . . . 117, 210 . . . 217. This is optional, but allows a more simple design of the module electronics.

In some embodiments, the communication bus has two cross connections between the strands 32, 33, through which the strands 32, 33 are closed to the ring. So that strong insulation is not needed in these cross connections, this cross connection is arranged where the voltage level of the modules between the two branches remains similar during operation. This is the case for the modules close to the direct current busbars, which is why the cross connection is arranged at the first two modules 110, 210 of the branches 11, 31 and at the last two modules 117, 217 of the two 11, 31.

The three Figures show different combinations of elements such as the linkage of the modules via a separate insulation path in each case, a common communication bus via a number of branches, separate buses for each arm and ring buses. The examples depicted are in no way mandatory combinations of the elements, instead the elements are also able to be combined in a combination other than that specified in the exemplary embodiments. For example, a variant not shown in the Figures consists, in a ring bus, of a part of the modules or of each of the modules being connected to both strands of the ring bus, whereby the fault tolerance of the ring bus is improved once again.

Figure 4:
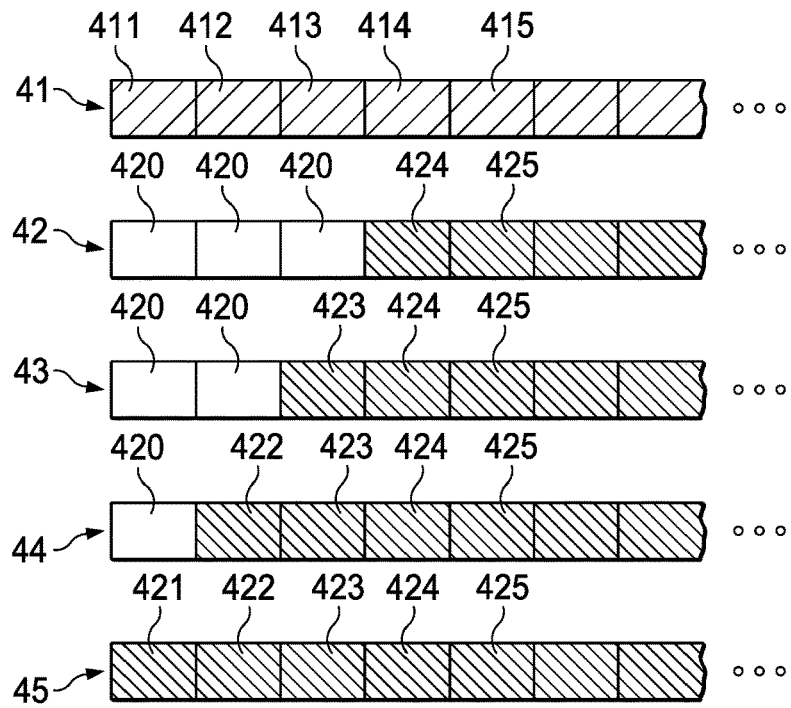
FIG. 4 shows an embodiment of the communication telegrams used, according to the teachings of the present disclosure.
Figure 5:
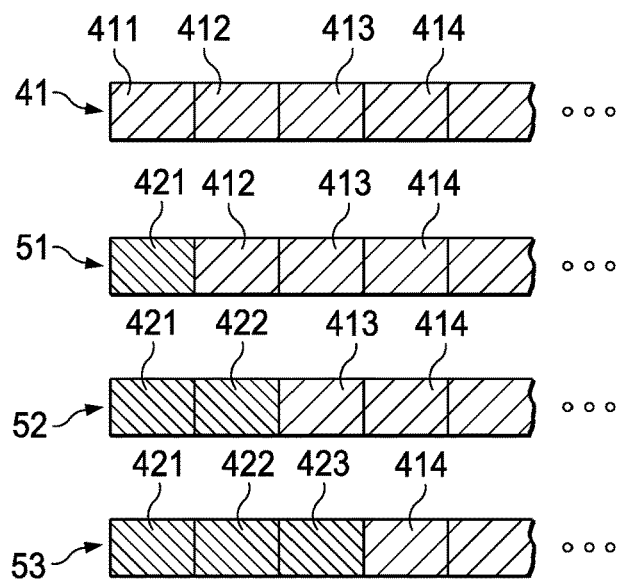
FIG. 5 shows a further embodiment of the communication telegrams used, according to the teachings of the present disclosure.

FIGS. 4 and 5 show options for how the data packets or communication telegrams in a multi-stage converter in accordance with the teachings herein can be structured and used. If a communication bus, which allows a direct communication from each of the submodules to the control is used, the form of the data packets as depicted in FIGS. 4 and 5 is unnecessary. If, however, the common communication connection comprises a strand as a connection from submodule to submodule, the form of the data packets may be improved.

In some embodiments, control commands are structured and sent as control data packets 41. Such a control data packet 41 comprises control commands 411 . . . 415 for the individual submodules. The first submodule takes the first control command 411 from the control data packet 41 and passes on the data packet to the subsequent submodule. This takes the second control command 412 from the control data packet 41 and so forth.

In some embodiments, an acknowledgement by the submodules takes place in the form of measurement data packets 42 . . . 45. These are sent out, starting from the last submodule, to the submodule arranged before it in each case. The measurement data packet 42 in this example comprises measurement data 424, 425 of the fourth and fifth submodule and possibly also further measurement data from further submodules. The fourth submodule passes the data packet on to the third submodule. The third submodule adds its own measurement data 423 to the measurement data packet 42. This can occur by the measurement data 423 being placed at the beginning of the measurement data packet 42 or by a placeholder being replaced, which has been sent in place of the measurement data 423 by the third submodule lying further behind. Subsequently the third submodule passes the now changed measurement data packet 43 on to the second submodule. This then proceeds in the same way.

The complete measurement data packet 45 with measurement data of all submodules is finally transferred to the control by the first submodule, which has the only direct connection to the control. This means that the control data packets 41 and the complete measurement data packets 45 have a similar structure.

FIG. 5 shows a form for the structure and the forwarding of the data packets that can be used for a ring-type structure without direct connection of the submodules to the control. In this case too, the control commands of the control are constructed and sent as control data packets 41. Such a control data packet 41 again comprises the control commands 411 . . . 415 for the individual submodules. The first submodule takes the first control command 411 from the control data packet 41 and passes on the data packet to the subsequent submodule. This takes the second control command 412 from the control data packet 41 and so forth.

By contrast with the procedure depicted in FIG. 4 however, the first submodule in this case replaces the first control command 411 by its own measurement data 421, which is placed at the same point in the data packet and thus in this example stands at the tip of the changed data packet 51. The second module thus receives the changed data packet 51, which comprises measurement data 421 and control commands 412 . . . 415, from the first submodule. The second submodule replaces the second control command 412 by its own measurement data 422, which is placed at the same point in the data packet and thus in this Figure directly follows the measurement data 421 of the first submodule. The second submodule then passes a further changed data packet 52 on to the third submodule, which proceeds likewise. The last submodule of such a sequence of submodules is directly connected to the control and then passes the measurement data packet 45, in which all control commands 411 . . . 415 are replaced by measurement data 421 . . . 425, on to the control.

What is claimed is:

1. A multi-stage converter comprising:
    a branch connected between a positive busbar and a negative busbar; and
    a control device;
    wherein the branch has at least two arms connected in series;
    the arms each comprise a series circuit including a plurality of two-pole transformers with a respective energy store and a communication connection to the control device;
    the communication connection transmitting information about a state of charge of the energy store and a switching instruction for a switch of the respective transformers; and
    for at least a subset of the tranformers, the communication connection comprises a common communication connection with a plurality of insulation paths having an insulation capability in each case of at most 5 kV.

2. The multi-stage converter as claimed in claim 1, wherein the insulation paths each have an insulation capability case of at most 600 V.

3. The multi-stage converter as claimed in claim 1, wherein the communication connections of each transformer of an arm or of a branch comprise a common communication connection.

4. The multi-stage converter as claimed in claim 1, further comprising one communication connection corresponding to each of the arms.

5. The multi-stage converter as claimed in claim 1, further comprising a common communication connection for all of the branches.

6. The multi-stage converter as claimed in claim 1, wherein:
    the communication connections form a bus connection; and
    signals of each transformer are received directly by the control device and vice versa.

7. The multi-stage converter as claimed in claim 1, wherein the common communication connection comprises a plurality of connections from a respective transformer to a next transformer.

8. The multi-stage converter as claimed in claim 1, wherein the common communication connection between the connection points of two neighboring transfomers in the series circuit of the arm comprises one of the insulation paths.

9. The multi-stage converter as claimed in claim 1, comprising a number of insulation paths at least half of a number of transformers.

10. The multi-stage converter as claimed in claim 1, wherein an order of linkage of the transformers to the common communication connection corresponds to an order of the arrangement in the respective arm of the multi-stage converter.

11. The multi-stage converter as claimed in claim 1, wherein the common communication connection comprises a ring with two strands connected in parallel to one another, the two strands connected to one another at the connection point of a first transformer and at the connection point of a second transformer.

12. The multi-stage converter as claimed in claim 11, wherein both strands include the same number of insulation paths.

13. The multi-stage converter as claimed in claim 11, wherein tranformers of a first arm of a first branch are connected to a first of the strands and transformers of a first arm of a second branch are connected to a second of the strands.

* * * * *